(12) United States Patent
Sako et al.

(10) Patent No.: US 8,575,857 B2
(45) Date of Patent: Nov. 5, 2013

(54) LED LIGHTING DEVICE

(75) Inventors: Hiroyuki Sako, Hirakata (JP);
Katsunobu Hamamoto, Neyagawa (JP);
Takeshi Saito, Hyogo (JP); Hiroki Nakagawa, Osaka (JP); Hiroshi Terasaka, Yokosuka (JP)

(73) Assignee: Panasonic Corporation, Osaka (JP)

( * ) Notice: Subject to any disclaimer, the term of this patent is extended or adjusted under 35 U.S.C. 154(b) by 211 days.

(21) Appl. No.: 13/159,777

(22) Filed: Jun. 14, 2011

(65) Prior Publication Data

US 2011/0316442 A1    Dec. 29, 2011

(30) Foreign Application Priority Data

Jun. 28, 2010    (JP) ................ 2010-146565

(51) Int. Cl.
*H05B 37/02* (2006.01)

(52) U.S. Cl.
USPC ........ 315/291; 315/185 R; 315/247; 315/307; 315/308

(58) Field of Classification Search
USPC ............ 315/185 R, 247, 291, 307, 308
See application file for complete search history.

(56) References Cited

U.S. PATENT DOCUMENTS

| | | | |
|---|---|---|---|
| 8,138,679 B2 * | 3/2012 | Konishi et al. ........... | 315/185 R |
| 2006/0061303 A1 | 3/2006 | Takeda et al. | |
| 2007/0159750 A1 * | 7/2007 | Peker et al. .................. | 361/93.1 |
| 2008/0284346 A1 | 11/2008 | Lee | |
| 2009/0021187 A1 | 1/2009 | Bhagat | |
| 2010/0219768 A1 * | 9/2010 | Takaki et al. ............... | 315/291 |
| 2010/0225235 A1 * | 9/2010 | Nagase ....................... | 315/130 |
| 2012/0187863 A1 * | 7/2012 | Nonaka et al. .............. | 315/291 |

* cited by examiner

FOREIGN PATENT DOCUMENTS

| | | |
|---|---|---|
| JP | 2006-10271 A | 1/2006 |
| JP | 2007-318879 A | 12/2007 |
| JP | 2009-43447 A | 2/2009 |

OTHER PUBLICATIONS

Extended European Search Report for the Application No. EP 11 16 4749 dated Nov. 15, 2011.

*Primary Examiner* — Douglas W Owens
*Assistant Examiner* — Thai Pham
(74) *Attorney, Agent, or Firm* — McDermott Will & Emery LLP

(57) ABSTRACT

The LED lighting device includes a lighting circuit unit, a current detecting unit, a voltage detecting unit, and a control unit. The lighting circuit unit is adapted in use to be connected to a lamp socket to be connected to a LED lamp, and is configured to provide an output voltage in the form of a DC voltage to the lamp socket in a manner to turn on the LED lamp. The current detecting unit is configured to detect an output current which is caused by the output voltage and is supplied from said lighting circuit unit to said lamp socket. The voltage detecting unit is configured to detect the output voltage of said lighting circuit unit. The control unit configured to control the lighting circuit unit. The control unit is configured to perform constant-current control of control the lighting circuit unit in a manner to regulate the output voltage such that the output current is identical to a target value while keeping the output voltage not higher than a maximum-load voltage, when the output current detected by the current detecting unit is not less than a predetermined threshold value, and is configured to perform no-load control of controlling the lighting circuit unit in a manner to regulate the output voltage such that the output voltage is kept identical to a no-load voltage higher than the maximum-load voltage, when the output current detected by the current detecting unit is less than the predetermined threshold value.

4 Claims, 3 Drawing Sheets

LED LIGHTING DEVICE

TECHNICAL FIELD

The present invention is directed to a LED lighting device for lighting LEDs (light emitting diodes).

BACKGROUND ART

In recent years, LEDs are used as light sources for lighting instead of fluorescent lamps. For example, a document 1 (Japanese Patent Publication Laid-Open No. 2009-43447) discloses an LED lamp which has a similar shape as a prior straight tube fluorescent lamp. This LED lamp includes a light source block including a mounted substrate formed into a strip shape and multiple LEDs mounted on the mounted substrate, a glass tube in the form of a straight tube configured to accommodate the light source block, caps fastening opposite open ends of the glass tube, and terminal pins projecting from aspects of the caps and used for supplying electrical power to the light source block. Such an LED lamp is detachably coupled to lamp sockets provided on a dedicated lighting fixture, and lights in response to power (DC power) supply from an LED lighting device provided on the lighting fixture through the lamp sockets.

Further, a document 2 (Japanese Patent Publication Laid-Open No. 2006-10271) discloses a prior instance regarding LED lighting devices. The prior instance disclosed in the document 2 detects a voltage (output voltage) provided to an LED lamp (a lamp socket) and a current (output current) flowing through an LED lamp, and performs control (constant-current control) of regulating the output voltage such that the output current becomes identical to a target value (e.g., a rated current of the LED lamp). When the LED lamp is detached from the lamp socket while the LED lighting device is in operation, the LED lighting device limits its output voltage not greater than a predetermined upper limit (referred to as a no-load voltage) in order to prevent an abnormal increase in the output voltage.

Between an electrode of the lamp socket and the terminal pin of the LED lamp is applied a DC voltage which exceeds tens of volts. Therefore, an arc discharge is likely to be developed between the electrode of the lamp socket and the terminal pin when the LED lamp is detached from the lamp socket. When the constant-current control is performed under the occurrence of the arc discharge, the output voltage is increased up to the no-load voltage. In this situation, the arc discharge may be difficult to extinguish.

When the LED lamp is coupled to the lamp socket while the LED lighting device is in operation, the constant-current control may cause an increase of the output voltage until the current flowing through the LED lamp becomes equivalent to the target value, and the output voltage may be equivalent to the no-load voltage. Consequently, in order to shorten a time of a continued arc discharge, the output voltage may be lowered when the output voltage reaches the no-load voltage. With this instance, the LED lamp may not be turned on successfully in response to attachment of the LED lamp to the lamp socket.

DISCLOSURE OF INVENTION

In view of the above insufficiency, the objective of the present invention is to shorten a time of a continued arc discharge as well as to turn on an LED lamp successfully.

The LED lighting device according to the present invention comprises: a lighting circuit unit adapted in use to be connected to a lamp socket to be connected to a LED lamp, and configured to provide an output voltage in the form of a DC voltage to the lamp socket in a manner to turn on the LED lamp; a current detecting unit configured to detect an output current which is caused by the output voltage and is supplied from the lighting circuit unit to the lamp socket; a voltage detecting unit configured to detect the output voltage of the lighting circuit unit; and a control unit configured to control the lighting circuit unit. The control unit comprises a judging unit and a voltage regulating unit. The judging unit is configured to judge whether or not the output current detected by the current detecting unit is not less than a predetermined threshold value which is less than a target value. The voltage regulating unit is configured to store a maximum-load voltage and a no-load voltage higher than the maximum-load voltage. The voltage regulating unit is configured to perform constant-current control of controlling the lighting circuit unit in a manner to regulate the output voltage such that the output current is identical to the target value while keeping the output voltage not higher than the maximum-load voltage, when the judging unit determines that the output current detected by the current detecting unit is not less than the predetermined threshold value. The voltage regulating unit is configured to perform no-load control of controlling the lighting circuit unit in a manner to regulate the output voltage such that the output voltage is kept identical to the no-load voltage, when the judging unit determines that the output current detected by the current detecting unit is less than the predetermined threshold value.

In a preferred aspect, the maximum-load voltage is higher than a rated voltage of the LED lamp, and is not higher than a withstand voltage of the LED lamp.

In a preferred aspect, the no-load voltage is defined to a voltage which does not flow through said LED lamp a current that exceeds a short circuit allowable current of said LED lamp.

BEST MODE FOR CARRYING OUT THE INVENTION

Hereinafter, an LED lighting device in accordance with the present invention is explained in detail with reference to drawings.

Figure 1:
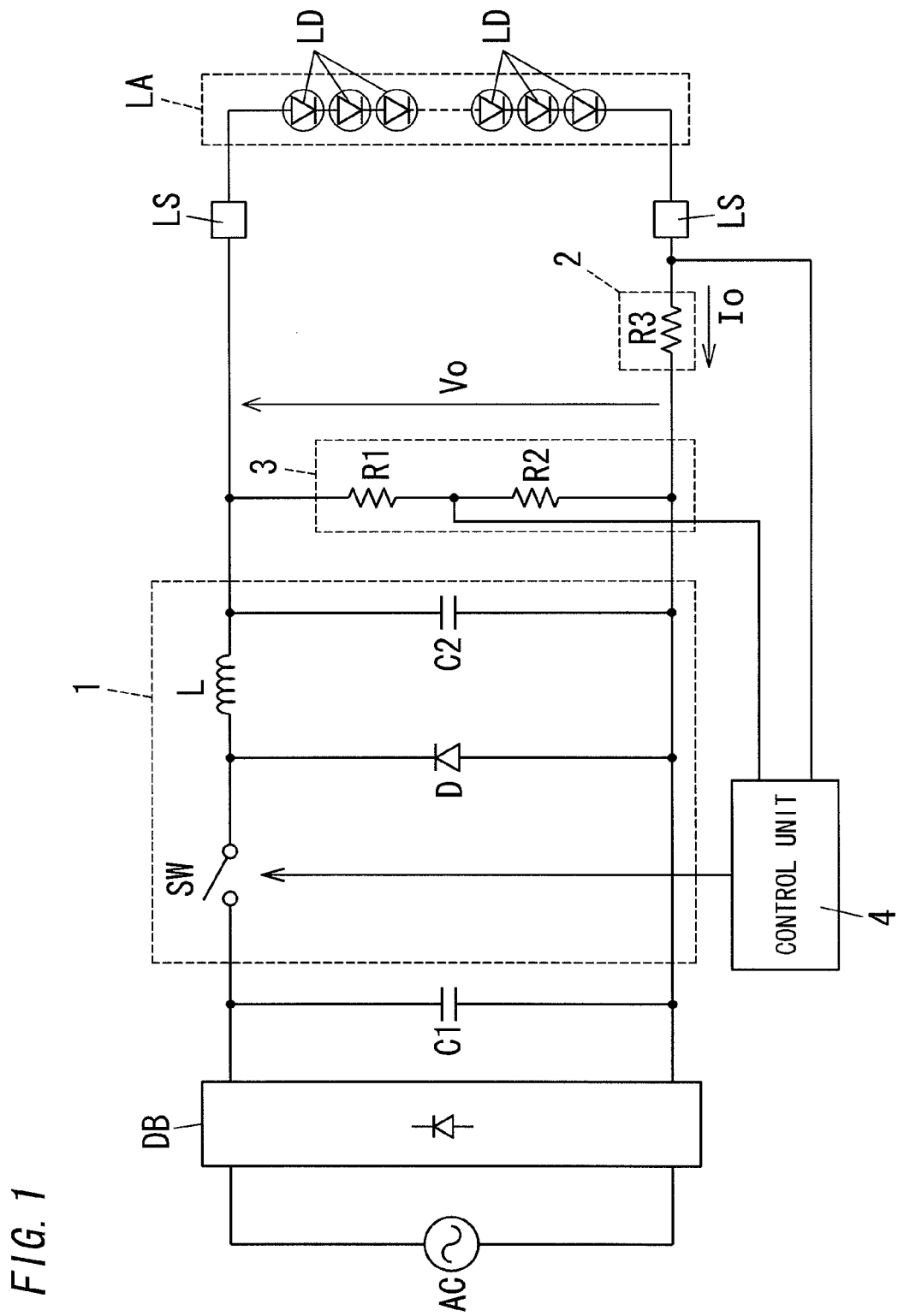
FIG. 1 is a circuit diagram illustrating an LED lighting device of one embodiment of the present invention.

FIG. 1 shows a lighting fixture including the LED lighting device of the present embodiment. The lighting fixture includes a diode bridge DB, a smoothing capacitor C1, the LED lighting device of the present embodiment, and two lamp sockets LS and LS.

The LED lighting device of the present embodiment, as shown in FIG. 1, includes a power converter (lighting circuit unit) 1, a current detecting unit 2, a voltage detecting unit 3, and a control unit 4. The power converter 1 has a variable output voltage Vo. The current detecting unit 2 is configured to detect an output current Io which is supplied to an LED lamp LA from the power converter 1 through the lamp sockets LS. The voltage detecting unit 3 is configured to detect the output voltage Vo applied across the LED lamp LA through the lamp sockets LA. The control unit 4 is configured to control the power converter 1 in a manner to increase or decrease the output voltage Vo such that the output current detected by the current detecting unit 2 is equivalent to a target value.

The LED lamp LA includes a light source block, a glass tube (not shown) in the form of a straight tube, caps (not shown), and terminal pins (not shown), in a similar manner as the LED lamp disclosed in the above document 1. The light source block is a series circuit of multiple light emitting diodes. The glass tube is configured to accommodate the light source block. The caps are configured to fasten opposite open ends of the glass tube. The terminal pins for supplying power to the light source block project from aspects of the caps. The light source block receives a DC current (i.e., output voltage Io) through the lamp socket LS and the terminal pin.

Each lamp socket LS includes a single electrode (not shown) adapted in use to be connected to the terminal pin of the LED lamp LA. Therefore, the LED lamp LA is connected between the two lamp sockets LS and LS. Alternatively, the lamp socket LS may includes two electrodes. With this arrangement, the lighting fixture includes one lamp socket LS, and the LED lamp LA is connected to this lamp socket LS.

The diode bridge DB is connected to an alternate current power source AC. The alternate current power source AC is, for example, a commercial power source. The diode bridge DB is configured to make full-wave rectification of an AC voltage received from the alternate current power source for generating a pulsating current voltage, and output the pulsating current voltage. Besides, the diode bridge DB can be substituted by another rectifier.

The smoothing capacitor C1 is connected between output terminals of the diode bridge DB. The smoothing capacitor C1 is configured to smooth the pulsating current voltage output from the diode bridge DB and provide the resultant voltage to the power converter 1.

Thus, the AC voltage supplied from the alternate current voltage AC is full-wave rectified by the diode bridge DB. Further, the pulsating current voltage outputted from the diode bridge DB is smoothed by the smoothing capacitor C1 and is provided to the power converter 1.

The power converter 1 is a step-down chopper circuit which comprises a semiconductor switching element (hereinafter, referred to as a switching element) SW, an inductor L, a diode D, and a capacitor C2. The switching element is, for example, a bipolar transistor, and a field-effect transistor. The power converter 1 is configured to decrease a DC input voltage, which is smoothed by the smoothing capacitor C1, down to a desired DC voltage. Such a step-down chopper circuit is well known, and no explanations of detailed configuration and operation thereof are deemed necessary. Besides, the lighting fixture may be connected to not the alternate current voltage source AC but a DC voltage source. In this situation, the power converter 1 may be configured to convert a DC voltage provided from the DC voltage source into a desired DC voltage. Alternatively, the power converter 1 is not limited to the step-down chopper circuit, but may be a step-up chopper circuit.

The voltage detecting unit 3 is a series circuit of dividing resistors R1 and R2 connected between output terminals of the power converter 1 (opposite ends of the capacitor C2). The voltage detecting unit 3 provides, to the control unit 4, a detection voltage (voltage proportional to the output voltage Vo) defined by the dividing resistors R1 and R2

The current detecting unit 2 is defined by a detecting resistor R3 which is connected between the negative-potential output terminal of the power converter 1 and the negative terminal of the lamp socket LS. The current detecting unit 2 provides, to the control unit 4, a detection voltage identical to a voltage drop across the detecting resistor R3 when the output current Io flows through it.

The control unit 4 is realized by use of such as a microcomputer and a memory, and is configured to control the power converter 1 in a manner to increase or decrease the output voltage Vo such that the output current Io detected by the current detecting unit 2 is equivalent to the target value. For example, the control unit 4 has a memory which stores data of rated current values of the LED lamp LA. The control unit 4 converts the detection voltage received from the current detecting unit 2 into a magnitude (current value) of the output current Io. The control unit 4 regulates a duty ratio of the switching element SW in a manner to increase or decrease the output voltage Vo such that the resultant current value is equivalent to the rated current value (target value) stored in the memory. In brief, the control unit 4 performs a control (constant-current control) of providing a constant current (rated current) to the LED lamp LA.

The rated voltage of the LED lamp LA is defined as a product ($=Vf*n$) of a forward voltage Vf of the light emitting diode LD used in the LED lamp LA and the number n of the light emitting diodes LD (besides, when the light source block includes current-limiting resistors, voltage drops caused by the current-limiting resistors are added to the above product). For example, when the forward voltage Vf is 3.5 V, and the number n of the light emitting diodes LD is 20, the rated voltage is 70 V which is calculated by multiplying 3.5 V by 20. Besides, the light emitting diodes exhibit the individual forward voltages Vf which may be different from each other. Therefore, the light emitting diode designed to have a forward voltage of 70V may exhibit its rated voltage greater or less than 70 V (setting value). In view of this possible variation in the forward voltage Vf, an upper limit (maximum load voltage) is given to the voltage applied to the LED lamp LA. In brief, the control unit 4 performs the constant-current control such that a value obtained by converting the detection voltage of the voltage detecting unit 3 into the output voltage Vo is not greater than the maximum-load voltage. Although the LED lamp LA does not always break down immediately upon receiving a voltage exceeding the maximum-load voltage, it may suffer from shortened lifetime or breakage due to heat developed through continued flow of a current exceeding the rated current.

In addition, the control unit 4 compares a predetermined lower limit with the current value of the output current Io converted from the detection voltage received from the current detecting unit 2. The control unit 4 determines a state (load-presence state) in which the LED lamp LA is coupled to the lamp sockets LS, when the current value is not less than the lower limit, and performs the constant-current control. In contrast, the control unit 4 determines a state (load-absence state) in which no LED lamp LA is coupled to the lamp sockets LS, when the current value is less than the lower limit, and terminates the constant-current control, and maintains the output voltage Vo of the power converter 1 identical to the no-load voltage. Besides, the no-load voltage is selected to exceed the maximum-load voltage.

Figure 2:
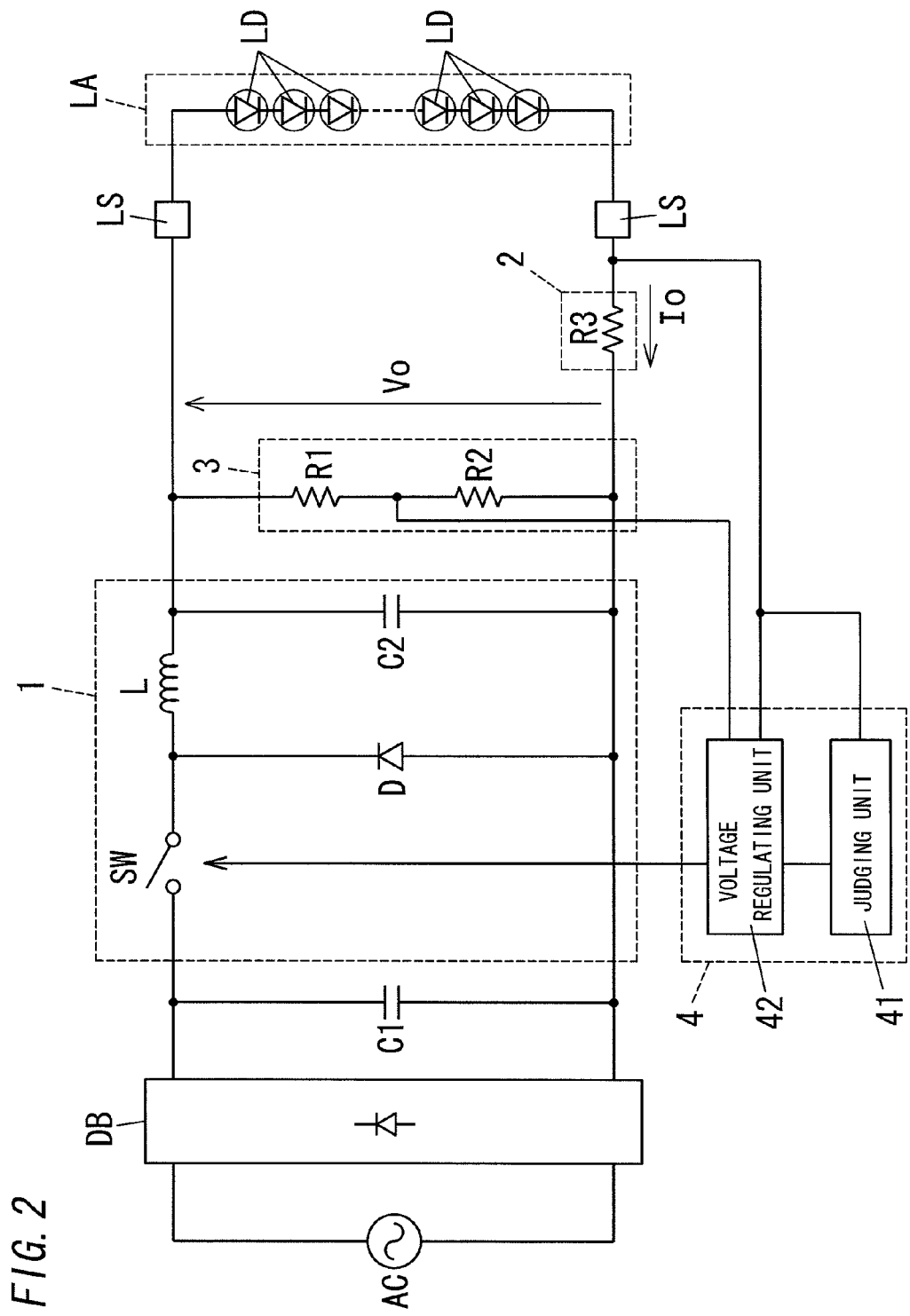
FIG. 2 is a circuit diagram illustrating the above LED lighting device.

The above control unit 4 includes, as shown in FIG. 2, a judging unit 41 and a voltage regulating unit 42.

The judging unit 41 is configured to judge whether or not the output current Io detected by the current detecting unit 2 is not less than the predetermined threshold (lower limit). The judging unit 41 determines the load-presence state when the output current Io detected by the current detecting unit 2 is not less than the threshold (lower limit). The judging unit 41 determines the load-absence state when the output current Io detected by the current detecting unit 2 is less than the threshold (lower limit).

The voltage regulating unit 42 is configured to store the maximum-load voltage and the no-load voltage which is higher than the maximum-load voltage.

The voltage regulating unit 42 is configured to, when the judging unit 41 determines that the output current Io detected by the current detecting unit 2 is not less than the predetermined threshold value (the judging unit 41 determines the load-presence state), perform the constant-current control of controlling the lighting circuit unit 1 in a manner to regulate the output voltage Vo such that the output current Io is identical to the target value while keeping the output voltage Vo not higher than the maximum-load voltage. In the present embodiment, the voltage regulating unit 42 regulates the duty ratio of the switching element SW to regulate the output voltage Vo of the lighting circuit unit 1 such that the output current Io is identical to the target value. Besides, when the output voltage Vo detected by the voltage detecting unit 3 reaches the maximum-load voltage, the voltage regulating unit 42 maintains the output voltage Vo identical to the maximum-load voltage even if the output current Io does not reach the target value.

In the present embodiment, preferably, the maximum-load voltage is higher than the rated voltage of the LED lamp LA, and is not higher than a withstand voltage of the LED lamp. The withstand voltage is defined as an upper limit of a voltage which does not flow through the LED lamp LA a current that exceeds an allowable current (continuous current rating) of the LED lamp LA.

The voltage regulating unit 42 is configured to, when the judging unit 41 determines that the output current Io detected by the current detecting unit 2 is less than the threshold (lower limit) (the judging unit 41 determines the load-absence state), perform the no-load control of controlling the lighting circuit unit 1 in a manner to keep the output voltage Vo identical to the no-load voltage.

In a situation where the LED lamp LA is not connected to the lighting circuit unit 1, the output current Io cannot flow. Consequently, the voltage regulating unit 42 performs the no-load control. That is, between the lamp sockets LS and LS is applied the no-load voltage. Therefore, when the LED lamp LA is connected between the lamp sockets LS and LS, the no-load voltage is applied between the terminal pins of the LED lamp LA. The no-load voltage is selected to exceed the maximum-load voltage in order to successfully and immediately turn on the LED lamp LA. The no-load control is performed while the output current Io is less than the lower limit. Therefore, even if a current exceeding the allowable current of the LED lamp LA flows through the LED lamp LA due to the no-load voltage, the control manner is switched from the no-load control to the constant-current control immediately, and the output voltage Vo is decreased from the no-load voltage down to the maximum-load voltage. Therefore, the current exceeding the allowable current (continuous current rating) of the LED lamp LA cannot flow through the LED lamp LA for a long time. According to the present embodiment, the no-load voltage can be higher than the withstand voltage of the LED lamp LA. However, the no-load voltage is preferred to be defined to a voltage which does not flow through said LED lamp LA a current that exceeds a short circuit allowable current of said LED lamp LA.

Figure 3:
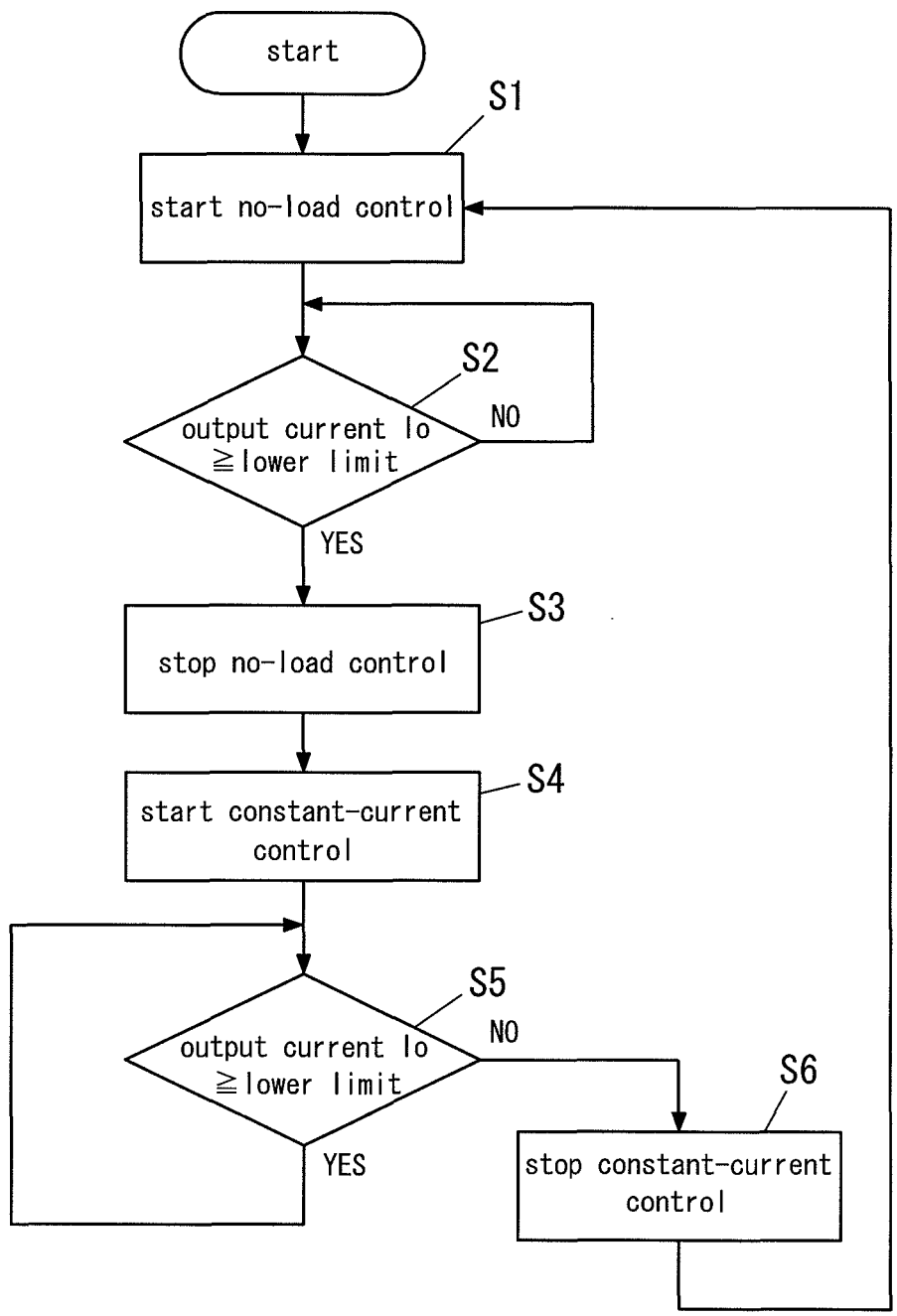
FIG. 3 is a flowchart illustrating operation of the above LED lighting device.

FIG. 3 shows a flowchart of operation of the LED lighting device of the present embodiment. Since no current flows through the LED lamp LA at the start of the operation of the LED lighting device, the output current Io is less than the lower limit. Therefore, the judging unit 41 determines that the LED lighting device is in the no-load state, and the voltage regulating unit 42 starts to perform the no-load control (step S1). While the no-load control is performed, between the lamp sockets LS and LS is applied the no-load voltage which is higher than the maximum-load voltage. Thus, the LED lamp LA connected between the lamp sockets LS and LS lights immediately and successfully.

The voltage regulating unit 42 continues performing the no-load control until the output current Io becomes greater than the lower limit ("No" in step S2).

When the output current Io increases and therefore exceeds the lower limit ("Yes" in step S2), the judging unit 41 determines that the LED lighting device is in the load-presence state, and the voltage regulating unit 42 terminates performing the no-load control (step S3), and starts to perform the constant-current control (step S4).

While the output current Io is not less than the lower limit, the voltage regulating unit 42 continues performing the constant-current control ("Yes" in step S5).

When the output current Io decreases and therefore falls below the lower limit ("No" in step S5), the judging unit 41 determines that the LED lighting device is in the load-absence state, and the voltage regulating unit 42 terminates performing the constant-current control (step S6), and starts to perform the no-load control (step S1).

When the LED lamp LA is removed from the lamp sockets LS under a condition where the control unit 4 performs the constant-current control, normally, the current value derived from the detection voltage of the current detecting unit 2 becomes less than the lower limit, and therefore the control unit 4 terminates performing the constant-current control. However, when an arc discharge develops between the cap of the LED lamp LA and the holder of the lamp socket LS, the current value may not fall below the lower limit, and therefore the control unit 4 may continue performing the constant-current control. In the constant-current control of the control unit 4, the output voltage Vo of the power converter 1 is limited not to exceed the maximum-load voltage. Accordingly, the arc is extended with an increase of a distance between the holder of the lamp socket LS and the cap of the LED lamp LA which has been removed from the lamp socket LS, and therefore the arc is extinguished (arc extinguishing). Thus, it is possible to shorten a time of a continued arc discharge than is made in the prior art.

The control unit 4 controls the power converter 1 in a manner to keep the output voltage not greater than the no-load voltage when the LED lamp LA is being attached to the lamp socket LS. Therefore, the control unit 4 does not limit the output voltage Vo of the power conversion 1 not to exceed the maximum-load voltage, until the current which is not less than the lower limit flows through the LED lamp LA after the LED lamp LA is attached to the lamp sockets LS. Thus, the LED lamp LA can be turned on immediately and successfully. When the current value obtained from the detection voltage of the current detecting unit 2 reaches the lower limit, the control unit 4 starts to perform the constant-current control of the power converter 1, and therefore the output voltage of the power converter 1 is limited not to exceed the maximum-load voltage. Accordingly, it is enabled to prolong the lifetime of the LED lamp LA (light emitting diode LD)

The aforementioned LED lighting device of the present embodiment includes the power converter 1, the current detecting unit 2, the voltage detecting unit 3, and the control unit 4. The power converter 1 has the variable output voltage Vo. The current detecting unit 2 is configured to detect the output current Io supplied to the LED lamp LA from the power converter 1 through the lamp sockets LS. The voltage detecting unit 3 is configured to detect the output voltage Vo applied across the LED lamp LA via the lamp sockets LS. The control unit 4 is configured to control the power converter 1 in a manner to increase or decrease the output voltage Vo such that the output current Io detected by the current detecting unit 2 is identical to the target value. The control unit 4 controls the power converter 1 such that the output voltage Vo does not exceed the predetermined maximum-load voltage when the output current 10 detected by the current detecting unit 2 is not less than the predetermined lower limit. The control unit 4 controls the power converter 1 such that the output voltage Vo does not exceed the predetermined no-load voltage higher than the maximum-load voltage when the output current Io detected by the current detecting unit 2 is less than the predetermined lower limit.

In other words, the LED lighting device of the present embodiment comprises the power converter (lighting circuit unit) 1, the current detecting unit 2, the voltage detecting unit 3, and the control unit 4. The lighting circuit unit 1 is adapted in use to be connected to the lamp sockets LS to be connected to the LED lamp LA. The lighting circuit unit 1 is configured to provide the output voltage Vo in the form of a DC voltage to the lamp socket LS in a manner to turn on the LED lamp LA. The current detecting unit 2 is configured to detect the output current Io which is caused by the output voltage Vo and is supplied from the lighting circuit unit 1 to the lamp socket LS. The voltage detecting unit 1 is configured to detect the output voltage Vo of the lighting circuit unit 1. The control unit 4 is configured to control the lighting circuit unit 1. The control unit 4 comprises the judging unit 41 and the voltage regulating unit 42. The judging unit 41 is configured to judge whether or not the output current Io detected by the current detecting unit 2 is not less than the predetermined threshold value which is less than the target value. The voltage regulating unit 42 is configured to store the maximum-load voltage and the no-load voltage higher than the maximum-load voltage. The voltage regulating unit 42 is configured to perform the constant-current control of controlling the lighting circuit unit 1 in a manner to regulate the output voltage Vo such that the output current Io is identical to the target value while keeping the output voltage Vo not higher than the maximum-load voltage, when the judging unit 41 determines that the output current Io detected by the current detecting unit 2 is not less than the predetermined threshold value. The voltage regulating unit 42 is configured to perform the no-load control of controlling the lighting circuit unit 1 in a manner to regulate the output voltage Vo such that the output voltage Vo is kept identical to the no-load voltage, when the judging unit 41 determines that the output current Io detected by the current detecting unit 2 is less than the predetermined threshold value.

According to the aforementioned LED lighting device of the present embodiment, it is possible to successfully turn on the LED lamp as well as to shorten a time of a continued arc discharge.

The invention claimed is:

1. An LED lighting device comprising:
a lighting circuit to be connected to a lamp socket to which an LED lamp is to be connected, and configured to provide an output voltage in a form of a DC voltage to the lamp socket;
a current detecting circuit configured to detect an output current which is caused by the output voltage and is supplied from the lighting circuit to the lamp socket;
a voltage detecting circuit configured to detect the output voltage of the lighting circuit; and
a control circuit configured to control the lighting circuit, wherein:
the control circuit, including a memory, stores a maximum-load voltage and a no-load voltage higher than the maximum-load voltage in the memory, the no-load voltage being a voltage to be applied when the LED lamp is not connected to the lamp socket, and
the control circuit is configured to:
judge whether or not the output current detected by the current detecting circuit is not less than a predetermined threshold value which is less than a target value,
perform constant-current control on the lighting circuit to regulate the output voltage such that the output current is equal to the target value while keeping the output voltage not higher than the maximum-load voltage, when the control circuit determines that the output current detected by the current detecting circuit is not less than the predetermined threshold value, and
perform no-load control on the lighting circuit to regulate the output voltage such that the output voltage is kept equal to the no-load voltage, when the control circuit determines that the output current detected by the current detecting circuit is less than the predetermined threshold value.

2. The LED lighting device as set forth in claim 1, wherein the maximum-load voltage is higher than a rated voltage of the LED lamp, and is not higher than a withstand voltage of the LED lamp.

3. The LED lighting device as set forth in claim 1, wherein the no-load voltage is a voltage which does not have a current that exceeds a short circuit allowable current of the LED lamp flow through the LED lamp.

4. The LED lighting device as set forth in claim 2, wherein the no-load voltage is a voltage which does not have a current that exceeds a short circuit allowable current of the LED lamp flow through the LED lamp.

* * * * *

UNITED STATES PATENT AND TRADEMARK OFFICE
CERTIFICATE OF CORRECTION

| | |
|---|---|
| PATENT NO. | : 8,575,857 B2 |
| APPLICATION NO. | : 13/159777 |
| DATED | : November 5, 2013 |
| INVENTOR(S) | : Hiroyuki Sako |

It is certified that error appears in the above-identified patent and that said Letters Patent is hereby corrected as shown below:

Title Page, in item "(73) Assignee", Assignees should read -- Panasonic Corporation, Osaka (JP) and Toshiba Lighting & Technology Corporation, Kanagawa (JP) -- rather than "Panasonic Corporation, Osaka (JP)"

Page 1 of 1

Signed and Sealed this
Eighteenth Day of November, 2014

Michelle K. Lee
*Deputy Director of the United States Patent and Trademark Office*